June 23, 1925.
C. J. SPENCER
BULL POKE
Original Filed Feb. 27, 1924
1,543,194
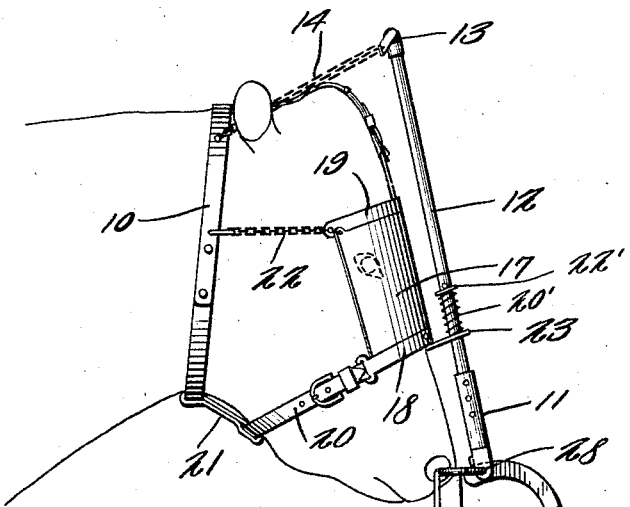
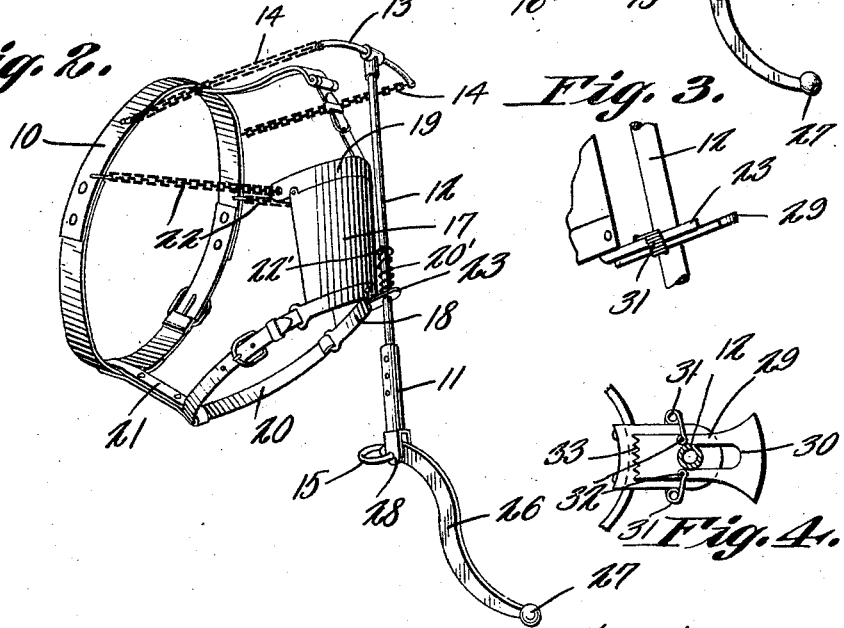
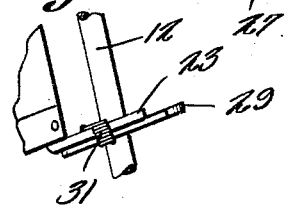
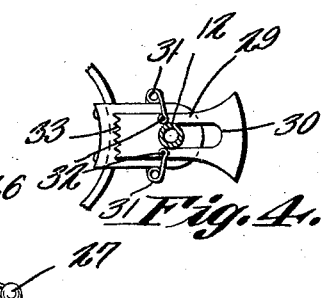
C. J. Spencer,
INVENTOR
BY Victor J. Evans
ATTORNEY Patented June 23, 1925.

1,543,194

UNITED STATES PATENT OFFICE.

CORTE J. SPENCER, OF DUNDEE, NEW YORK.

BULL POKE.

Application filed February 27, 1924, Serial No. 695,528. Renewed January 17, 1925.

*To all whom it may concern:*

Be it known that I, CORTE J. SPENCER, a citizen of the United States, residing at Dundee, in the county of Yates and State of New York, have invented new and useful Improvements in Bull Pokes, of which the following is a specification.

This invention contemplates the provision of a safety device for large and vicious animals designed to be arranged upon the head of the animal to prevent the latter from breaking down stalls, jumping fences or the like, and embodies amongst other features a curved arm which projects forwardly and downwardly from a point adjacent the nose of the animal, and capable of being swung upwardly to permit the animal to graze.

Another object of the invention resides in the provision of a device of the above mentioned character which embodies a blinder designed to prevent the animal from seeing directly ahead, but allowing the animal to see from either side of the blinder, the latter making it easier to handle the animal under certain conditions.

A further object of the invention resides in the provision of yieldably supported plate mounted for sliding movement and adapted to be moved into contact with the nose of the animal when the plate is brought into engagement with a fence or other obstruction, the plate being formed with teeth on one edge and adapted to prick the nose of the animal under the conditions above mentioned with a view of intimidating the animal.

The nature and advantages of the invention will be better understood when the following detailed description is read in connection with the accompanying drawing, the invention residing in the construction, combination and arrangement of parts as claimed.

In the drawing forming part of this aplication, like numerals of reference indicate similar parts in the several views, and wheren:

Figure 1 is a view showing the safety device positioned upon the head of the animal.

Figure 2 is a perspective view of the device removed.

Figure 3 is a fragmentary view of a modified form of the invention showing the use of the nose engaging plate.

Figure 4 is a view showing the normal position of the sliding plate.

Referring to the drawing in detail, 10 represents a collar preferably constructed of metal, and to which collar the safety device is attached. The device preferably embodies a rod including a hollow section 11 which slidably receives the section 12, the latter supporting a cross piece 13 at the upper end thereof, which cross piece is terminally connected to the collar 10 through the instrumentality of the chains 14. This rod is arranged directly in advance of the head of the animal, the section 11 being supported by a nose ring 15, which is preferably a separate ring from the ring used for leading the animal and which latter mentioned ring is indicated at 16.

The device also embodies a blinder 17 which is secured to curved bands 18 and 19 respectively, the bands are preferably constructed of metal, and suitably curved to conform to the shape of the head of the animal. The band 18 is secured to the terminals of a strap 20, which in turn is secured to the collar 10 by means of an additional strap 21, while the band 19 is terminally secured to chains 22 attached to the collar 10. When the blinder is used, it is arranged in the manner shown in Figure 1, which of course prevents the animal from seeing directly ahead and thereby making it much easier to handle the animal under any and all circumstances.

However, the blinder is so arranged to permit the animal to see from either side thereof, and also to look downwardly on the ground for grazing purpose. Projecting forwardly from the band 18 and preferably forming an integral part thereof, is an apertured lug 23, upon which reposes one end of the coiled spring 20', the latter encircling the section 12 of the rod and having its other end bearing against a cross pin 22', thereby relieving the nose ring of undue weight of the device generally.

Projecting forwardly and downwardly from the lower end of the rod is a curved arm 26 having a spherical extremity indicated at 27 and which arm is primarily instrumental in preventing the animal from breaking down stalls as well as tearing down or jumping fences. The arm 26 is pivotally connected with the lower end of the rod as at 28, and this connection is such that the arm cannot move downwardly beyond the position it occupies in Figure 1, but can be readily raised when brought into contact with the ground or otherwise to permit the animal to graze.

In Figures 3 and 4, I have shown a modified construction, wherein I make use of a nose engaging member clearly illustrated in Figure 4, and which member is designed and used to intimidate the animal should the latter attempt to destroy fences, stalls or other property. This member is in the nature of an elongated plate 29 which is longitudinally slotted as at 30 to receive the section 12 of the rod above referred to, and as shown in Figures 3 and 4, this plate is arranged directly beneath the apertured lug 23 and adapted to slide on the bottom thereof. Arranged at either side of the lug 23 are coiled springs 31, which springs have their corresponding upper extremities secured to the upper side of the lug 23, while the corresponding lower extremities are secured to the underside of the plate 29 as at 32. These springs normally hold the plate in the position shown in Figure 4, wherein the forward edge of the plate projects an appreciable distance in advance of the apertured lugs 23, thereby spacing the toothed edge 33 of the plate from the nose of the animal. The movement of the plate under the influence of the springs is limited by the length of the slot 30. By reason of the arrangement shown, when the plate is brought into contact with a fence or other obstruction, it is moved against the tension of the springs, whereupon the toothed edge 33 is brought into contact with the nose of the animal to intimidate it, and just as soon as the plate is moved away from the obstruction it contacts, the springs function to move the plate away from the nose of the animal.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A safety device for animals comprising in combination, a blinder, means for supporting the blinder across the eyes of the animal, a vertically disposed rod arranged directly in advance of the head of the animal, a nose ring supporting the lower end of the rod, a collar, means connecting the upper end of the rod with the collar, co-operating means carried by the blinder and rod to assist in supporting the weight of the latter, and a curved arm projecting forwardly and downwardly from the lower end of said rod and capable of upward pivotal movement for the purpose specified.

2. A safety device for animals comprising in combination, a blinder, means for supporting the blinder on the head of the animal, a vertical rod including telescopical sections, said rod being arranged directly in advance of the head of the animal, a nose ring supporting the lower section of the rod, an apertured lug projecting from said blinder and receiving the upper section of said rod, a shoulder formed on the last mentioned section, a coiled spring interposed between the shoulder and said lug to relieve the nose ring of undue weight, and a curved arm projecting forwardly and downwardly from said rod and capable of upward pivotal movement for the purpose specified.

3. A safety device for animals comprising in combination a blinder, means for supporting the blinder on the head of the animal, a vertically disposed rod arranged directly in advance of said head, means for supporting said rod and including an apertured lug projecting from the lower end of the blinder and receiving said rod, a curved arm projecting from the lower end of the rod, and capable of forward pivotal movement for the purpose specified, a plate mounted to slide on the underside of said apertured lug and having a longitudinal slot to receive said rod, teeth formed on one end of the plate and adapted to prick the nose of the animal when the plate is brought into contact with an object, and yieldable means supported by said lug and connected with said plate to normally hold the latter spaced from the nose of the animal and in advance of said lug.

In testimony whereof I affix my signature.

CORTE J. SPENCER.